(12) United States Patent
Beisswenger et al.

(10) Patent No.: US 7,148,444 B2
(45) Date of Patent: Dec. 12, 2006

(54) METHOD AND SYSTEM FOR RESISTANCE SEAM WELDING OF A FOIL AND AT LEAST ONE FOIL SUPPORT OF A FUEL CELL SYSTEM

(75) Inventors: Thomas Beisswenger, Stuttgart (DE); Arnold Lamm, Elchingen (DE); Thomas Poschmann, Ulm (DE); Bernhard Vogel, Stuttgart (DE); Wolfgang Weger, Hochdorf (DE); Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 122 days.

(21) Appl. No.: 10/777,428

(22) Filed: Feb. 12, 2004

(65) Prior Publication Data
US 2004/0226919 A1 Nov. 18, 2004

(30) Foreign Application Priority Data
Feb. 14, 2003 (DE) ................. 103 06 235

(51) Int. Cl.
B23K 11/06 (2006.01)
(52) U.S. Cl. ..................... 219/83; 219/117.1
(58) Field of Classification Search .................. 219/81, 219/82, 83, 117.1
See application file for complete search history.

(56) References Cited

U.S. PATENT DOCUMENTS

| 2,404,632 | A | | 7/1946 | Hansen | ........................ 219/82 |
| 3,469,363 | A | | 9/1969 | Yamauchi et al. | .............. 96/11 |
| 3,823,299 | A | | 7/1974 | Metcalfe et al. | ............... 219/83 |
| 5,147,086 | A | * | 9/1992 | Fujikawa et al. | ........ 228/235.1 |
| 6,011,236 | A | * | 1/2000 | Urech | ...................... 219/117.1 |
| 6,372,363 | B1 | | 4/2002 | Krueger | ....................... 428/606 |
| 2002/0083829 | A1 | | 7/2002 | Edlund et al. | .................. 95/55 |

FOREIGN PATENT DOCUMENTS

| DE | 44 38 281 | | 4/1996 |
| DE | 10044406 | | 7/2001 |
| FR | 1 087 321 | | 2/1955 |
| GB | 2355418 | | 4/2001 |
| JP | 8-215551 | * | 8/1996 |
| JP | 08215551 | | 8/1996 |

OTHER PUBLICATIONS

Search Report of EP 1 447 165 and brief translation thereof—5 pages.

* cited by examiner

Primary Examiner—Kevin P. Kerns
(74) Attorney, Agent, or Firm—Davidson, Davidson & Kappel, LLC

(57) ABSTRACT

A method and a system for resistance seam welding of a foil and at least one foil support of a fuel cell system. During welding, the thin foil, together with the thicker foil support, is moved relative to the roller electrode while resting on a flat support element. In a suitable welding system, a counter-electrode is designed as a flat support element, such as a welding strip, that is displaceable relative to the roller electrode, the roller electrode being in rolling contact with the foil support, but not with the foil. Depending on whether one foil is to be welded to one or two foil frames, the support element may be designed having a high or a low specific electric resistance.

11 Claims, 4 Drawing Sheets

METHOD AND SYSTEM FOR RESISTANCE SEAM WELDING OF A FOIL AND AT LEAST ONE FOIL SUPPORT OF A FUEL CELL SYSTEM

Priority is claimed to German Patent Application No. DE 103 06 235.1, filed on Feb. 14, 2003, the entire disclosure of which is incorporated by reference herein.

BACKGROUND

The present invention relates to a method and a system for resistance seam welding of a foil and at least one foil support of a fuel cell system.

Diaphragm modules which contain metal separation diaphragms or foils are used in fuel cells which are operated using hydrogen which is extracted from hydrocarbons, methanol, for example. At low permeation rates metal separation foils function selectively and in a temperature-stable manner. In selective separation of hydrogen via a metal separation foil, the permeation rate depends on the foil material, the pressure, the temperature, and the foil thickness. The temperature range is generally between 250° C. and 450° C. No noteworthy hydrogen separation occurs below 250° C. Intermetallic structural transformations, which drastically deteriorate permeation, occur above 450° C. when palladium-copper alloys are used. The metal separation foils separate a high-pressure area from a low-pressure area in the diaphragm module. The higher the differential pressure between the two areas, the better the permeation rate. The differential pressure is limited by the strength of the foil. The efficiency of the fuel cell system decreases because a good deal of energy must be spent in producing high pressures. The thinner a foil, the higher the permeation rate. As a rule, metal separation foils have a thickness of less than 25 micrometer. The metal separation foils are framed for the use in diaphragm modules. In known systems, the metal separation foils are pressed with graphite seals or are sealingly joined with one another by spattering of blocking layers. The known systems have a carbon monoxide leak rate which is insufficient for commercial applications. If, in addition to hydrogen, carbon monoxide diffuses to the low-pressure side, then the required purity of the anode gas for the fuel cell system is not provided.

A hydrogen separator for a fuel cell reformer is described in Unexamined Patent Application DE 100 44 406 A1 in which a palladium foil having a thickness of 3–15 micrometer is applied to a mesh wire-shaped support structure via pressing or via rolling and pressing. The foil adjusts in part to the support structure, thereby increasing the effective surface, and the foil may expand and contract without ripping or forming creases. The wire mesh-shaped support structure has the disadvantage that, due to its waviness, the high-pressure and low-pressure sides of the fuel cell reformer cannot be operated reliably sealed from one another.

In principle, welding methods are to be considered for joining thin workpieces. Two workpieces are melted in each welding process, both workpieces being liquefied along a weld seam. Since, as a rule, the melting energy is supplied from one source such as, for example, a gas burner, an electric arc, or a laser light source, sufficient energy must be made available for both workpieces. If a foil and one or two foil supports of a fuel cell system are to be welded together, the problem arises that the joined pieces have different mass or thickness so that the foil would initially melt and run without being joined with the unmolten foil frame. Mechanically pressing the two pieces together is not an option in gas melt methods, electric arc methods, or in the use of laser light since the pre-stress produced must be in the welding area and thus molten, i.e., welded.

A thin separator foil is applied to a porous metal body in the hydrogen separator described in JP 08-215 551 A. A peripheral support frame is inserted in the edge area of the metal body to compensate for unevenness. The construction made up of separator foil, support frame, and metal body is joined with a bracket by hermetic welding, thereby creating a separation between a high-pressure area and a low-pressure area. Hermetic welding is carried out using a laser beam or an electron beam, a sealing weld seam being produced on the front side of the construction and on the bracket. The danger of defects exists due to the different thicknesses of the materials used, in particular in the area of the very thin separator foil. The reliability of the seal is affected. Furthermore, seam welding may be considered in joining thin workpieces. These methods are resistance welding methods. The workpieces to be joined are passed between two rollers. While the rollers rotate, they transfer force and current to the workpieces. A continuous linear seam is formed under constant current. The workpieces have electric resistance. Due to the specific resistance of the joining parts, heat is generated by the current flow, so that the necessary melting energy is released. In workpieces having different thicknesses, no melting away of the thinner workpiece occurs, since the workpieces are pressed together by the rollers. The rollers themselves are made of a metal having a high melting point and are actively cooled so that there is no fusion with the workpiece. Very thin workpieces cannot be welded to relatively thick workpieces using conventional seam welding methods, since the danger exists that the thin workpiece is damaged.

SUMMARY OF THE INVENTION

An object of the present invention is to develop a method and a system for resistance seam welding of a foil and at least one foil support of a fuel cell system which reduce the leak rate for carbon monoxide during use in a diaphragm module and improve on the reliability of the fuel cell system.

The present invention provides a method for resistance seam welding of a foil and at least one foil support of a fuel cell system. According to the method, the thicker foil support is paired with the foil, and the foil support and the foil are joined gas-tight by resistance heating by using a roller electrode and an electric power supply. During welding, the foil (3, 8) and the foil support (2, 6, 7) are moved together relative to the roller electrode (20) while resting on a flat support element (12, 13). The invention also provides a system for resistance seam welding of a foil and at least one foil support of a fuel cell system, having a roller electrode and a counter-electrode, the foil and the foil support being pressed between them, the roller electrode being movable relative to the foil and the foil support, and having an electric power supply whose terminals are connected to the roller electrode and the counter-electrode. The counter-electrode is designed as a flat support element (13) which is displaceable relative to the roller electrode (20), and the roller electrode (20) is in rolling contact with the foil support (2, 6)

According to the present invention, in seam welding of a foil and at least one foil support, foil and foil support are moved together relative to a roller electrode while resting on a flat support element. Prior to welding, the foil is mechanically fixed on the support element using one or two foil carriers or foil frames. A positioner having a welding strip is preferably provided as the support element. The foil does not come in contact with the roller electrode during welding. The roller electrode rolls on the relatively thick foil frame located on top, the foil remaining flat on the positioner or fixed between the two foil frames. This makes it impossible for the pressing and the rolling movement of the roller electrode to damage the thin foil. The pressing forces are absorbed by the foil frame which is in contact with the roller electrode. During welding, the support element or the positioner may be moved relative to the stationary axis of the roller electrode, or the roller electrode is moved along the stationary support element. If multiple parallel linear seams are to be produced, a corresponding number of roller electrodes arranged in parallel may be provided and simultaneously supplied with current. In order to avoid creases and buckles in the foil, the welded workpieces may be subjected to a heat treatment. For increasing the permeation rate, annealing in vacuum or under an inert gas or under pure hydrogen may follow the welding process. Foil supports and foils welded in this way allow for the lightweight design of hydrogen separation modules.

BRIEF DESCRIPTION OF THE DRAWINGS

The present invention is explained in greater detail in the following on the basis of exemplary embodiments and with reference to the drawings, in which.

DETAILED DESCRIPTION

Figure 1:
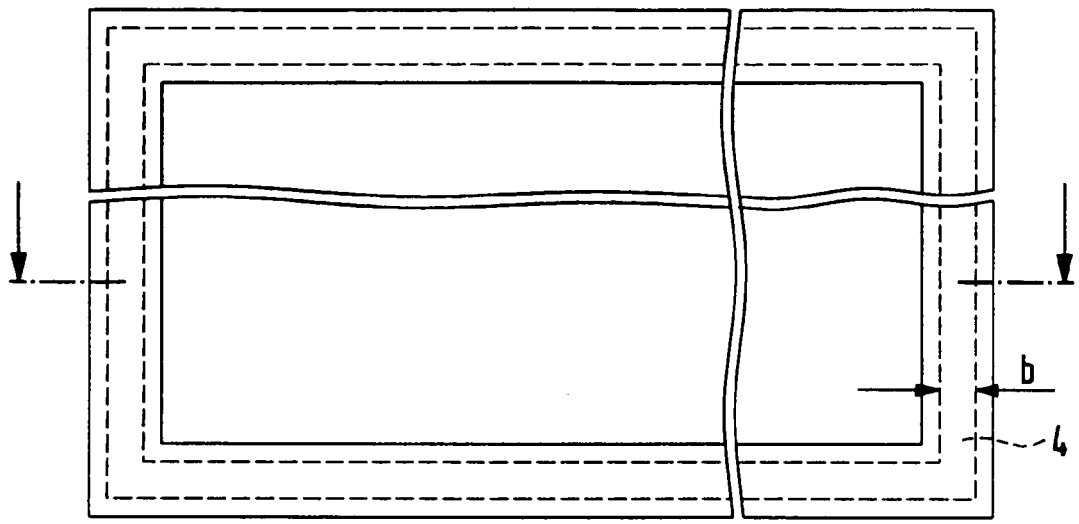
FIG. 1 shows a schematic representation of a welding group composed of one foil frame and one foil in two views.
Figure 1:
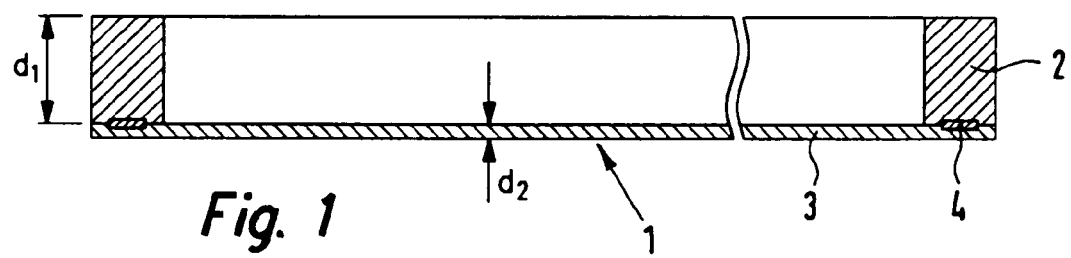

The schematic representation of a welding group 1 in FIG. 1 shows, in top view and sectional view, a foil frame or foil support 2 and a foil 3 which are welded together for use in a fuel cell system. Weld seam 4 of width b runs peripherally and concentrically to foil frame 2 which has the same outer dimensions as foil 3. Foil frame 2 has a thickness $d_1 = 200$ μm and is made of a ferritic material such as austenitic steel or nickel. Foil 3 has the thickness $d_2 = 10$ μm. Thickness $d_2$ of foil 3 may vary depending on the application. Further practical thicknesses are 18 μm or 25 μm. Foil 3 is suited for hydrogen separation in a reformer module of the fuel cell system and is made, for example, of a palladium- and copper-containing alloy. Other alloys are also possible. Weld seam 4 connects foil 3 and foil frame 2 so tight together that there is a leak rate of smaller than $10^{-7}$ mbar*liter/second or that less than 40 ppm of carbon monoxide is present in the anode gas flow.

Figure 2:
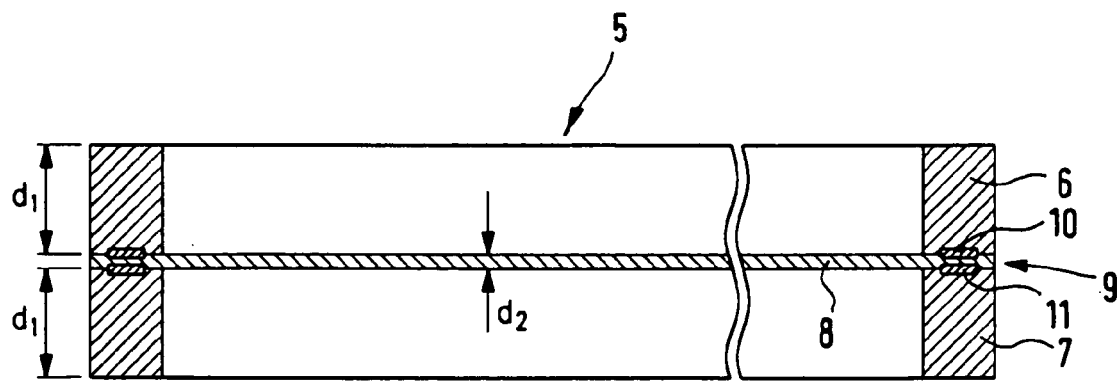
FIG. 2 shows a schematic representation of a welding group composed of two foil frames and one foil.

FIG. 2 shows a welding group 5 including two foil frames 6, 7 of the same thickness and the same size and a foil 8 positioned between them. The comment made in connection with FIG. 1 applies with regard to material, dimensions, and leak tightness. Welding group 5 has a peripheral weld seam 9 including two melting areas 10, 11 situated between foil 8 and foil frames 6, 7, respectively.

Figure 3:
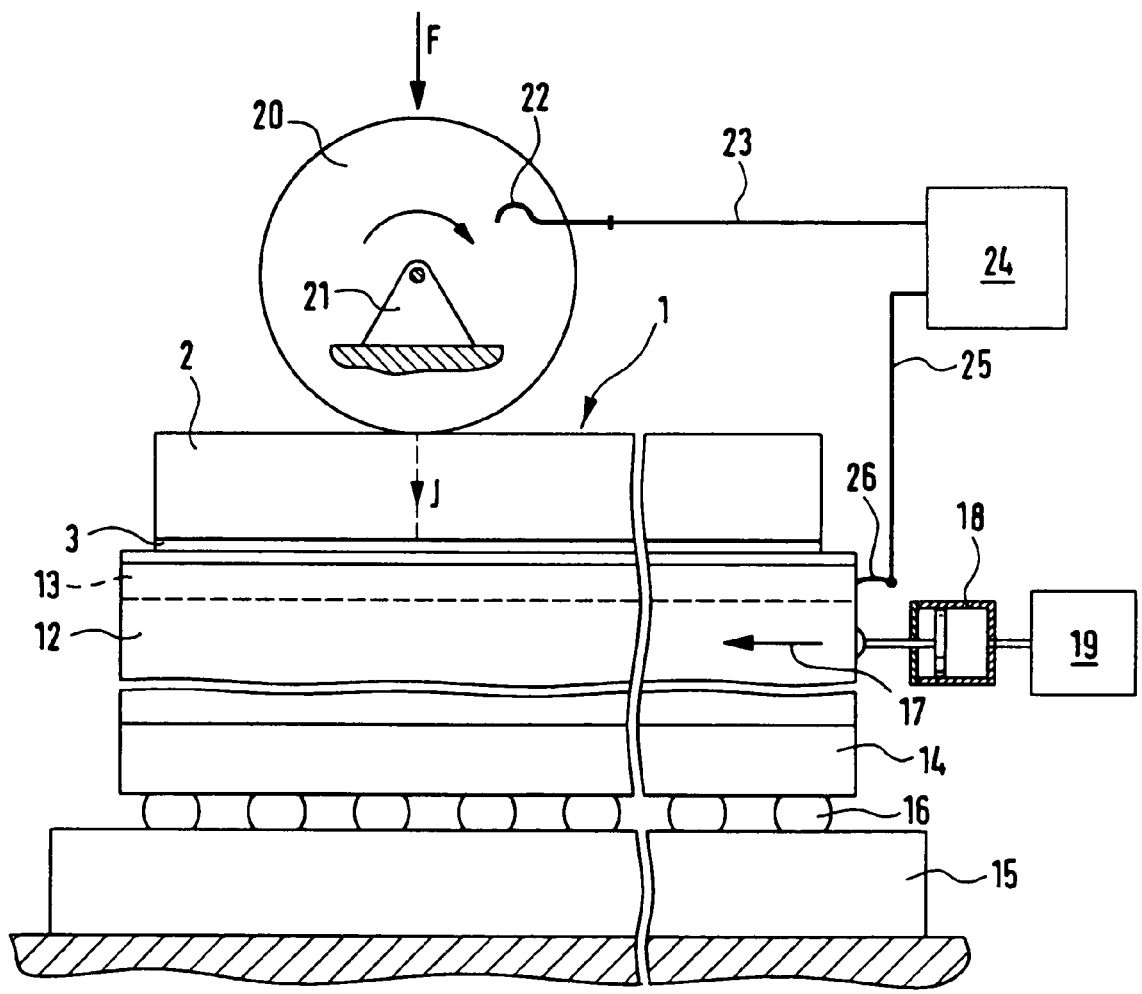
FIG. 3 shows a schematic representation of a welding device for manufacturing the welding group according to FIG. 1.
Figure 4:
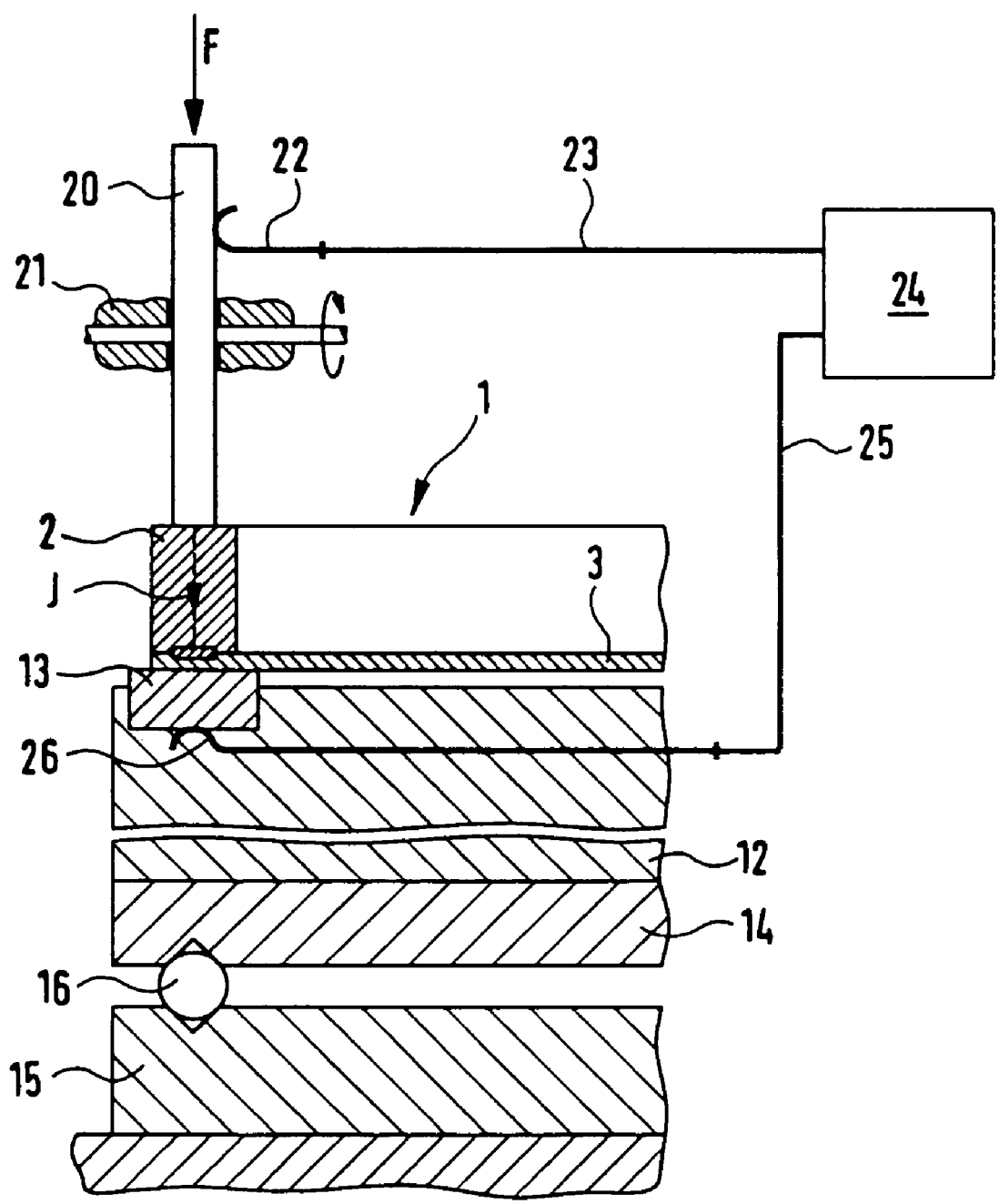
FIG. 4 shows an orthogonal view of the welding device according to FIG. 3.

FIGS. 3 and 4 are schematic representations of a welding device for manufacturing the welding group according to FIG. 1. Foil frame 2 situated on top and foil 3 situated beneath it are flush on top of each other, mechanically pre-fixed, and positioned on a positioner 12. A welding strip 13 is embedded, slightly protruding, in positioner 12 on the side facing foil 3. Guide strips 14 of a longitudinal guide are situated at the bottom of positioner 12. In addition, the longitudinal guide includes a stationary guide bar 15 and roll bodies 16. Positioner 12 is displaceable in forward feed direction 17 using the longitudinal guide. A working cylinder 18 which is connected to a pneumatic control unit 19 is provided to displace positioner 12. Any positioning mechanism may be used instead of working cylinder 18. One side of foil frame 2 and welding strip 13 are positioned parallel to the forward feed direction 17. A roller electrode 20 which is rotatably held in a stationary bearing 21 contacts foil frame 2 at the center of the leg of foil frame 2. Using force F, roller electrode 20 presses welding group 1 against welding strip 13 in positioner 12. Roller electrode 20 is connected to a contact piece 22 which is connected to a terminal of a power supply 24 by a line 23. Line 25 connects the other terminal of power supply 24 to a contact piece 26 which feeds the welding current to welding strip 13. Contact pieces 22, 26 are suited for carrying high welding currents.

Figure 5:
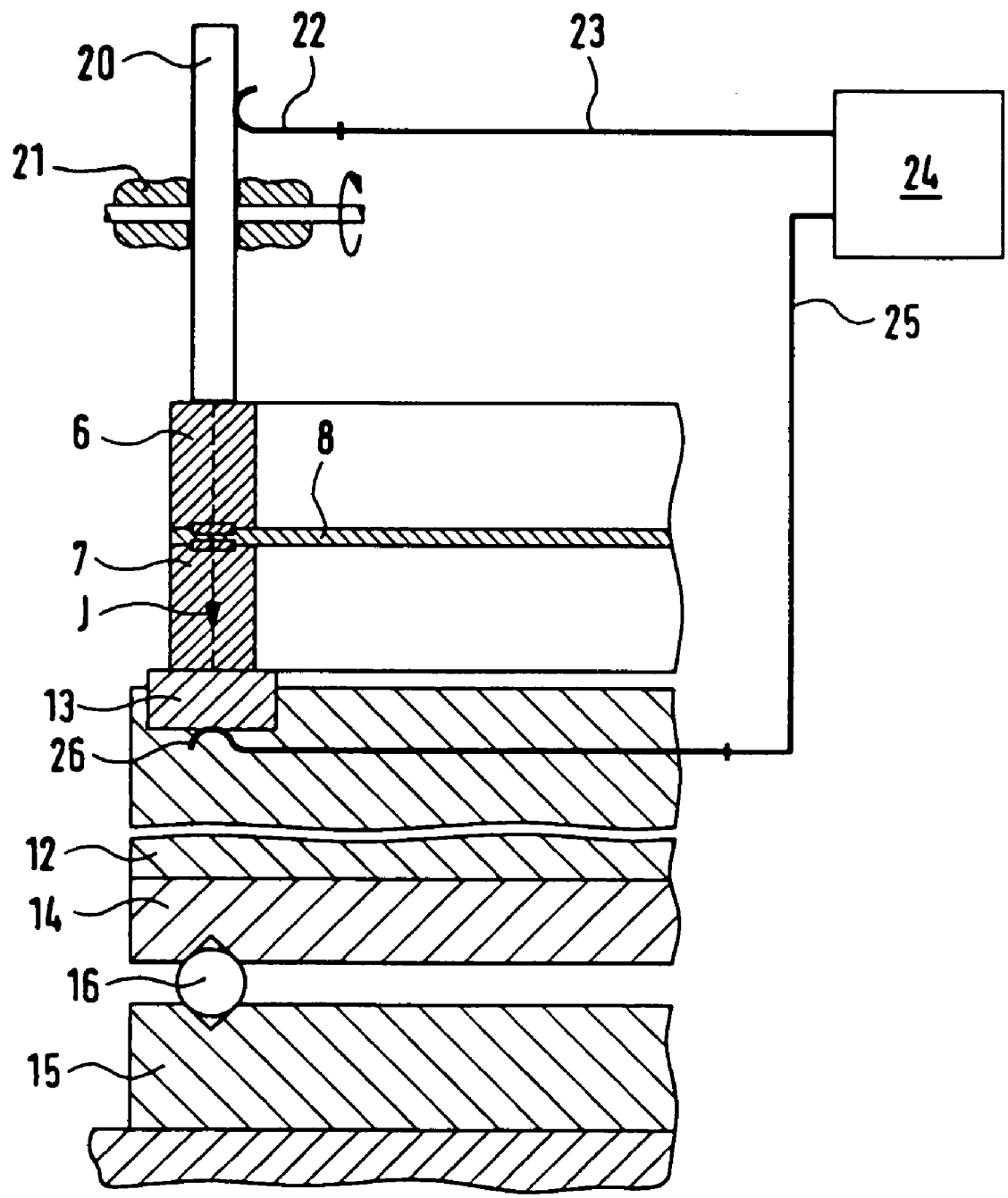
FIG. 5 shows a schematic representation of a welding device for manufacturing the welding group according to FIG. 2.

Similarly to FIG. 4, FIG. 5 shows the design of the welding system for manufacturing the welding group according to FIG. 2. In contrast to FIG. 4, two foil frames 6, 7 and a foil 8 positioned between them are held mechanically pre-fixed on positioner 12. Roller electrode 20 is in contact with foil frame 6 which is positioned on top, while foil frame 7 which is positioned on the bottom is in contact with welding strip 13. All other elements shown in FIG. 5 have the functions described in FIGS. 3 and 4.

The manufacture of welding groups 1, 5 using the systems according to FIGS. 3 through 5 is described in the following:

Using working cylinder 18, positioner 12 is moved in the forward feed direction 17 at uniform speed for permanent and leak-proof joining of foils 3 or 8 with foil support 2 or 6, 7, respectively. Power supply 24 generates a current I, the circuit being formed by lines 23, 25, contact pieces 22, 26, roller electrode 20, welding strip 13, and the particular welding group 1 or 5. According to Ohm's law, the welding power is determined by the resistance and the current I. The resistance at the welding point is composed of the individual resistances of each workpiece. The individual resistance of a workpiece results from the product of the specific resistance and the quotient formed by the length and cross-sectional area of the current path. It is disregarded that a weld seam is not exactly defined and that several current paths may run in parallel. The specific resistance is material-specific. The length of the current path corresponds to the material thickness of a workpiece, and the cross-sectional area corresponds to the contact surface of roller electrode 20 on foil frame 2 or 6, situated on top. The contact surface is kept constant due to the constant pressing forces of roller electrode 20. Thus, the melting heat in the material results as a function of the material thickness and welding current I. That is, the thinner the workpiece, the less heat is released in it and accordingly less melting heat is necessary. To keep the contact resistance low, foil frames 2, 6, 7 and foils 3, 8 are manufactured with a small peak-to-valley height, preferably in the range of 1–2 μm, which is easily achieved via rolling.

In the system according to FIGS. 3 and 4, resistance heat (or meltig heat J ) is generated only in the one metallic foil frame 2 situated on top. Since foil 3 rests on welding strip 13 and too little heat is generated within foil 3 itself during welding, welding strip 13 must have a high specific resistance in order to make heat available which is transferred onto thin foil 3. To keep the welding conditions constant, welding strip 13 and roller electrode 20 are actively cooled in this case. Otherwise, several welding processes would cause heating of welding strip 13 and roller electrode 20 which would result in a change in the welding parameters. In this system, welding strip 13 is advantageously made of a tungsten-copper alloy which has extreme endurance. The material of roller electrode 20 has a low specific resistance. A suitable material having extreme endurance is a copper-beryllium alloy or a tungsten-copper alloy.

In the system according to FIG. 5, melting heat J is released in both foil frames 6, 7. The melting heat in melting areas 10, 11 is sufficient to tightly join together foil frames 6, 7 and foil 8. In this case, welding strip 13 is made of a material having a low specific resistance and extreme endurance which is provided by a copper-beryllium alloy or a tungsten-copper alloy, for example.

Since seam welding involves a relative displacement between roller electrode 20 and foil frames 2, 6, small displacements between foil frames 2, 6 and foil 3, 8 occur during welding. This creates creases in foil 3, 8. During use of foil 3, 8 in the reformer module of a fuel cell system, foil 3, 8 is subject to a differential pressure which presses the creases together. This inevitably results in folding and buckling of foil 3, 8. If this folding and buckling occurs in the area of weld seam 9-11 or several bucklings intersect in foil 3, 8, then microcracks may occur in the foil material which result in leaks. In order to avoid this, it is advantageous if welding groups 1, 5 undergo an aftertreatment which is described below.

If foils 3, 8 are manufactured by rolling, the individual metal bodies are stretched and strained. The strain-related increase in tension also increases the hardness of the material. This increase in hardness is undesirable, and therefore welding groups 1, 5 undergo a heat treatment after welding. During this process, foils 3 or 8 together with foil frames 2 or 6, 7 are heated to 425° C. in a controlled, slow heating, then kept at this temperature for one hour, and subsequently cooled down to 70° C. This heat treatment causes recrystallization in foils 3, 8. After this treatment, foils 3, 8 contain no more undesirable tensions. Foils 3 or 8 themselves are stretched in foil frames 2 or 6, 7. Possible residual creases in foils 3, 8 may be removed by using geometric holding devices.

The permeation rate of a foil 3, 8 is determined by the inner structure of the foil material. Depending on the type of first-time operation of a foil 3, 8, different permeation rates may occur. In order to approximate the permeation to the theoretically possible value in the first place, it is of advantage to anneal foils 3 or 8 together with foil frames 2 or 6, 7 in vacuum. It is also possible to anneal welding groups 1, 5 under an inert gas, or under pure hydrogen.

The heat treatment may include slowly heating the foil to a first temperature value during a first time period, keeping the foil at the first temperature value during a second time period and, decreasing the temperature of the foil to a second temperature value during a third time period. The foil may contain at least one of palladium and copper and a ratio of the first to the second time period to the third time period may be essentially 5:2:1. For example, the first time period may last 2.5 hours, the second time period 1 hour, and the third time period 0.5 hour.

References to specific values, such as time or temperature values, are to be understood as referring to approximate values, i.e. to a range of values that approximate the named value.

What is claimed is:

1. A method for resistance seam welding of a foil and at least one foil support of a fuel cell system, the method comprising:
   pairing the at least one foil support with the foil;
   disposing the foil and at least one foil support on a flat support element;
   welding the at least one foil support and the foil in a gas-tight manner by resistance heating using a roller electrode and an electric power supply; and
   moving the foil and the at least one foil support on the support element relative to the roller electrode during the welding.

2. The method as recited in claim 1, wherein the at least one foil support includes only one foil support, and wherein the disposing is performed so that the foil is in contact with the support element.

3. The method as recited in claim 1, wherein the at least one foil support includes two foil supports, wherein the pairing includes disposing the foil between the two foil supports, and wherein the disposing is performed so that one of the two foil supports is in contact with the support element.

4. The method as recited in claim 1, further comprising performing a heat treatment on the foil and the at least one foil support after the welding.

5. The method as recited in claim 4, wherein the heat treatment includes slowly heating the foil to a first temperature value during a first time period, keeping the foil at the first temperature value during a second time period and, decreasing the temperature of the foil to a second temperature value during a third time period.

6. The method as recited in claim 5, wherein the foil contains at least one of palladium and copper and a ratio of the first to the second time period to the third time period is essentially 5:2:1.

7. The method as recited in claim 6, wherein the first time period lasts 2.5 hours, the second time period lasts 1 hour, and the third time period lasts 0.5 hour.

8. The method as recited in claim 6, wherein the first temperature value is 425° C. and the second temperature value is 70° C.

9. The method as recited in claim 1, further comprising annealing the foil and the at least one foil support after the welding.

10. The method as recited in claim 9, where the annealing is performed in a vacuum.

11. The method as recited in claim 9, wherein the annealing is performed under at least one of an inert gas and pure hydrogen.

* * * * *

UNITED STATES PATENT AND TRADEMARK OFFICE
CERTIFICATE OF CORRECTION

PATENT NO. : 7,148,444 B2 Page 1 of 1
APPLICATION NO. : 10/777428
DATED : December 12, 2006
INVENTOR(S) : Thomas Beisswenger et al.

It is certified that error appears in the above-identified patent and that said Letters Patent is hereby corrected as shown below:

On the title page, in paragraph
(56) References cited
under the heading
U.S. PATENT DOCUMENTS
reference
"3,469,363 A   9/1969  Yamauchi et al. ......... 96/11"
should be changed to
--3,469,372 A   9/1969  Yamauchi et al. ..........96/11--.

Signed and Sealed this

Tenth Day of April, 2007

JON W. DUDAS
*Director of the United States Patent and Trademark Office*